US008446310B2

(12) United States Patent
Law et al.

(10) Patent No.: US 8,446,310 B2
(45) Date of Patent: May 21, 2013

(54) METHOD AND SYSTEM FOR LOCATING SIGNAL JAMMERS

(75) Inventors: Sarah E. Law, Denver, CO (US); Charles A. Corwin, Lone Tree, CO (US); David C. Fisher, Evergreen, CO (US)

(73) Assignee: Raytheon Company, Waltham, MA (US)

( * ) Notice: Subject to any disclaimer, the term of this patent is extended or adjusted under 35 U.S.C. 154(b) by 538 days.

(21) Appl. No.: 12/483,729

(22) Filed: Jun. 12, 2009

(65) Prior Publication Data

US 2010/0045506 A1    Feb. 25, 2010

Related U.S. Application Data

(60) Provisional application No. 61/189,948, filed on Aug. 22, 2008.

(51) Int. Cl.
*G01S 7/36* (2006.01)

(52) U.S. Cl.
USPC .............................................. 342/16; 342/13

(58) Field of Classification Search
USPC .......................................................... 342/16
See application file for complete search history.

(56) References Cited

U.S. PATENT DOCUMENTS

| | | | | |
|---|---|---|---|---|
| 4,728,959 | A * | 3/1988 | Maloney et al. | 342/457 |
| 6,417,799 | B1 | 7/2002 | Aubain et al. | |
| 6,598,009 | B2 * | 7/2003 | Yang | 702/152 |
| 6,744,408 | B1 * | 6/2004 | Stockmaster | 342/453 |
| 6,771,220 | B1 * | 8/2004 | Ashe et al. | 342/417 |
| 7,142,155 | B2 * | 11/2006 | Iwami | 342/357.25 |
| 7,233,284 | B2 * | 6/2007 | Velicer et al. | 342/433 |
| 7,577,464 | B2 * | 8/2009 | Ezal et al. | 455/562.1 |
| 7,657,230 | B2 * | 2/2010 | Rowitch | 455/65 |
| 7,783,246 | B2 * | 8/2010 | Twitchell et al. | 455/1 |
| 7,912,643 | B1 * | 3/2011 | Bean et al. | 701/214 |
| 2002/0097184 | A1 | 7/2002 | Mayersak | |
| 2003/0204378 | A1 * | 10/2003 | Cai | 702/189 |
| 2004/0176909 | A1 * | 9/2004 | Desjardins | 701/213 |
| 2005/0083231 | A1 * | 4/2005 | Drentea | 342/357.12 |
| 2007/0008108 | A1 * | 1/2007 | Schurig et al. | 340/539.11 |
| 2007/0115175 | A1 | 5/2007 | Velicer et al. | |

OTHER PUBLICATIONS

Vulnerability Assessment of the Transportation Infrastructure Relying on the Global Positions System, John A. Volpe (NTSC): Aug. 29, 2001, 113 pages.

(Continued)

*Primary Examiner* — Matthew M Barker
(74) *Attorney, Agent, or Firm* — Schwegman Lundberg & Woessner, P.A.

(57) ABSTRACT

In a method embodiment, a method includes receiving data generated at one or more monitor systems capable of monitoring for electromagnetic signals. The data is related to characteristics of a signal. The characteristics may include at least two of a respective power of the signal, a respective frequency of the signal, a time of arrival of the signal, and an angle of arrival the signal. A computing system automatically selects at least a subset of the received data. The selection is based at least partially on a physical condition at a location proximate to the monitor systems. The computing system calculates a location of a source of the signal at least in part by processing the subset of the received data. The method further includes determining that the first signal is jamming a second signal. The determination is based at least in part on the calculated location.

15 Claims, 4 Drawing Sheets

OTHER PUBLICATIONS

"The Hunt for RFI," Clynch, Parker, Badger, Vincent, McGill, and Alder: GPS World, 1 Jan. 1, 2003, 6 pages.

"Jammer and Interference Location System—Design and Initial Test Results," Allison Brown (NAVSYS), Proceedings of the ION GPS 1999, pp. 1-6 Sep. 1999.

PCT, "Notification of Transmittal of the International Search Report and the Written Opinion of the International Searching Authority, or the Declaration," International Application No. PCT/US2009/052528, Mailed Jun. 28, 2010, 16 pages.

Brown et al., "Jammer and Interference Location System—Design and Initial Test Results," NAVSYS Corporation, Proceedings of the ION GPS 1999, pp. 137-142, Sep. 14, 2009 through Sep. 17, 2009.

Chestnut, "Emitter Location Accuracy Using TDOA and Differential Doppler," IEEE Transactions on Aerospace and Electronic Systems, vol. AES-18, No. 2, Mar. 1982.

* cited by examiner

FIG. 3B

| FILE | INPUTS/VARIABLES | DESCRIPTION |
|---|---|---|
| saveGPSData.m | FILENAME - EXCEL FILE CONTAINING GPS SCENARIO DATA SHEET - NAME OF SHEET CONTAINING DATA | SAVES THE SCENARIO DATA IN THE APPROPRIATE FORMAT FOR ALL OTHER SCRIPTS |
| runGPS.m | DATA - NAME OF FILE TO STORE RESULTING DATA IN LEVELS - VECTOR TO USE FOR DRAWING CONFIDENCE INTERVALS | RUNS THE GPS AoA SCRIPTS, DRAWS THE RESULTS IN MATLAB AND GENERATES OUTPUT FOR GOOGLE EARTH |
| findPDF.m | DATA - SCENARIO DATA XDELTA - GRID STEP TO USE SAVEDATA - NAME OF FILE TO STORE RESULTING DATA IN | CREATES A MESHGRID AND EVALUATES THE NORMAL PDF TO DETERMINE THE LIKELIHOOD THAT EACH POINT IN THE GRID IS THE GPS JAMMER USING THE AoA DATA. SAVE THE DATA INTO A MATLAB DATA FILE |
| deg2rad.m | ANGLE DEG - ANGLE IN DEGREES | CONVERTS DEGREES TO RADIANS |
| lla2ecef.m | LAT - LATITUDE IN RADIANS LON - LONGITUDE IN RADIANS ALT = HEIGHT ABOVE WGS84 ELLIPSOID IN METERS | CONVERTS LATITUDE, LONGITUDE, AND ALTITUDE TO EARTH-CENTERED, EARTH-FIXED (ECEF) COORDINATES |
| normalVector.m | X - POINT IN GIVEN PLANE Y - POINT IN GIVEN PLANE Z - POINT IN GIVEN PLANE | GIVEN THREE POINTS X, Y, AND Z SPECIFYING A PLANE, FINDS THE UNIT NORMAL VECTOR TO THE PLANE |
| drawConfidenceContours.m | DATA - NAME OF *.mat FILE WHERE DATA IS STORED LEVELS - VECTOR TO USE FOR DRAWING CONFIDENCE INTERVALS | DRAWS CONFIDENCE CONTOURS GIVEN A DATA SET AND A LIST OF CONFIDENCE LEVELS |
| findContour.m | P - CONFIDENCE INTERVAL TO FIND PDF - PDF FOR THE MESHGRID XDELTA - CHANGE IN X YDELTA - CHANGE IN Y | NUMERICALLY INTEGRATES TO FIND CONFIDENCE INTERVALS |
| ge_contours_int | X - VECTOR OF X VALUES Y - VECTOR OF Y VALUES DATA - DATA CORRESPONDING TO X AND Y VALUES V - VECTOR TO USE FOR DRAWING CONTOURS VARAGIN - ADDITIONAL ARGUMENTS TO GOOGLE EARTH | MODIFIED "ge_contour" FROM GOOGLE EARTH TOOLBOX. DRAWS CONTOUR PLOTS IN GOOGLE EARTH |
| ge_plot3 | X - x DATA IN ECEF Y - y DATA IN ECEF Z - z DATA IN ECEF VARAGIN - ADDITIONAL ARGUMENTS TO GOOGLE EARTH | FROM GOOGLE EARTH TOOLBOX. PLOTS IN GOOGLE EARTH |
| ge_output | FILENAME - FILE TO WRITE TO OUTPUT - XML TO PLACE IN KML FILE VARAGIN - ADDITIONAL ARGUMENTS TO GOOGLE EARTH | FROM GOOGLE EARTH TOOLBOX. WRITES OUT KML FILE FOR GOOGLE EARTH |

METHOD AND SYSTEM FOR LOCATING SIGNAL JAMMERS

RELATED APPLICATION

This application claims benefit under 35 U.S.C. §119(e) of U.S. Provisional Application Ser. No. 61/189,948, entitled "NAVIGATION WARFARE SITUATIONAL AWARENESS" filed Aug. 22, 2008, by Charles A. Corwin et al.

TECHNICAL FIELD

This disclosure relates in general to signal processing, and more particularly to a method and system for locating signal jammers.

BACKGROUND

Numerous civilian and military applications have a significant and growing reliance on Global Positioning System (GPS) services. For example, many vehicles are able to use GPS services in a variety of navigation applications that include plotting and tracking routes or flying and landing aircraft. One example of a military-specific application includes conducting close air support precision strikes on missile or bomb targets. Some GPS services are used to enable communication networks. For example, some U.S. wireless telecommunication systems rely on GPS timing services to synchronize clocks between cell phone towers. The reliance on GPS services to enable some critical applications, such as telecommunications, mass transit, and/or military operations, may subject GPS services to potential targeting or disruption by military adversaries and terrorist organizations.

Overview

In a method embodiment, a method includes receiving data generated at one or more monitor systems capable of monitoring for electromagnetic signals. The data is related to characteristics of a signal. The characteristics may include at least two of a respective power of the signal, a respective frequency of the signal, a time of arrival of the signal, and an angle of arrival the signal. A computing system automatically selects at least a subset of the received data. The selection is based at least partially on a physical condition at a location proximate to the monitor systems. The computing system calculates a location of a source of the signal at least in part by processing the subset of the received data. The method further includes determining that the first signal is jamming a second signal. The determination is based at least in part on the calculated location.

Depending on the specific features implemented, particular embodiments may exhibit some, none, or all of the following advantages. Various embodiments may be capable of automatically monitoring for signals that may be jamming or interfering with other signals used in a variety of civilian and military applications including, for example, GPS services at least partially enabled by signals transmitted by a network of satellites. Certain embodiments may be capable of estimating an approximate position of a source transmitting jamming or interfering signals by processing data related to different characteristics of the signals. In some embodiments, the estimated position may be accurate to within a few feet or less. Some embodiments may be capable of using the estimated position of the source transmitting jamming or interfering signals for purposes of navigating toward the source and/or disabling the source. Other technical advantages will be readily apparent to one skilled in the art from the following figures, description and claims.

BRIEF DESCRIPTION OF THE DRAWINGS

For a more complete understanding of the present disclosure and its advantages, reference is now made to the following description, taken in conjunction with the accompanying drawings, in which:

FIG. 3B shows a table listing example data files and their corresponding inputs, variables, and/or descriptions that may be used by various software programs in the execution of at least some of the example acts of the flowchart of FIG. 3A according to one embodiment;

DETAILED DESCRIPTION

Particular embodiments of the present disclosure may be explained in the context of various Global Positioning System (GPS) navigational services used by aircraft. Some aircraft use GPS services to facilitate takeoff, flight, and landings. Various GPS services may be disrupted, however, by interference broadcasted at or near the same frequencies used by the GPS services. The disruption of GPS services may, in some circumstances, place some aircraft at risk. The sources used to transmit potentially interfering signals may or may not be intentionally configured to cause such a disruption. For example, someone may inadvertently flip on a switch or tune a transmitter in a way that negatively affects GPS services in use by an airport. In another example, however, enemy combatants may intentionally use signal-jamming devices or "jammers" in an attempt to prevent a GPS-guided device or vehicle from attacking a particular target. Various embodiments of the present disclosure may use any combination of a variety of techniques to monitor for interfering signals and to estimate an approximate location of the corresponding sources. This information may then be used to locate and disable the sources of the interfering signals. The example embodiments of the present disclosure are best understood by referring to FIGS. 1 through 6 of the drawings, like numerals being used for like and corresponding parts of the various drawings.

Figure 1:
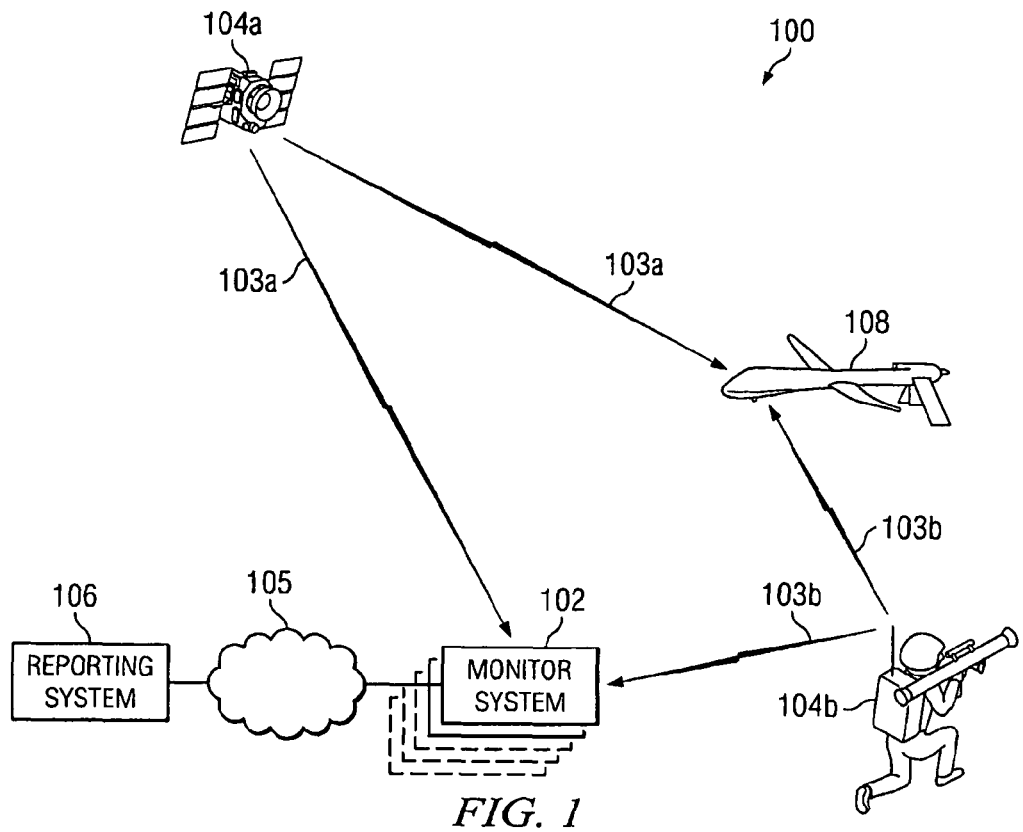
FIG. 1 is a block diagram illustrating a portion of a system for identifying and/or locating sources that may be transmitting jamming or interfering signals according to one embodiment.

FIG. 1 is a block diagram illustrating a portion of a system 100 for identifying and/or locating sources that may be transmitting jamming and/or interfering signals according to one embodiment. In the illustrated example, system 100 generally includes one or more monitor systems 102 in communication with a reporting system 106. As explained further below, monitor systems 102 generate data regarding electromagnetic signals 103 transmitted by respective sources 104. The data may relate, for example, to the angle of arrival, arrival time, power, and/or frequency of the signals 103 as measured at monitor systems 102. System 100 may selectively use at least a portion of this data to estimate the respective locations of each source 104. In addition, system 100 may selectively use the generated data to determine whether one source 104 is transmitting signals 103 that are jamming or interfering with the signals 103 transmitted by another source 104.

In the illustrated embodiment, for example, an enemy combatant causes a jammer 104b to emit a signal 103b that jams or interferes with a signal 103a emitted by a satellite 104a. System 100 may determine that signal 103a transmitted by satellite 104a is an expected signal 103 and that signal 103b transmitted by a device controlled by the enemy combatant is a jamming or interfering signal 103. The determination may be based at least partially on the data provided by monitor systems 102 and/or the estimated locations of sources 104a and 104b as determined by system 100.

Each monitor system 102 generally refers to one or more machines or apparatus capable of detecting electromagnetic signals 103 and determining one or more characteristics of each signal 103. For example, each monitor system 102 may include one or more directional antennas, transmitters, receivers, power detectors, frequency detectors, processors, memory, interfaces, inputs, outputs, data storage devices, any combination of the preceding, and/or any other machines or apparatus capable of detecting electromagnetic signals 103 and determining one or more characteristics of each signal 103. The determined characteristics may include, for example, the power of each signal 103, the angle of arrival, the time of detection, the frequency of each signal 103, any combination of the preceding, or some other characteristics of the detected signals 103.

Each monitor system 102 may be mobile or not readily mobile and may reside at any suitable location including on land, at sea, in air, and/or in outer space. For example, some monitor systems 102 may reside at a ground-based facility or may be disposed on and/or within land-based vehicles. Some other monitor systems 102 may be disposed on and/or within manned or unmanned aircraft or spacecraft, such as, for example, a RQ-4 Global Hawk. Still other monitor systems 102 may be disposed on and/or within a water platform, a deployable buoy, or a naval vessel. Various monitor systems 102 having receivers located at or near the Earth surface may offer large-scale, continuous monitoring capability for Earth-based jammers, though such capability may complicate the modeling of radio transmission near the Earth surface.

Some monitor systems 102 may collectively or individually form at least a portion of a network. For example, multiple monitor systems 102 may form a network substantially similar to the Air Force Satellite Control Network (AFSCN). Some monitor systems 102 may collectively form a network set of Navigation Warfare (NAVWAR) Electronic Warfare Support Measures (ESM) Terminals, or NETs. Particular monitor systems 102 may each include a tactical subnet of devices, such as, for example, a subnet of multiple handheld navigational computers.

In a particular embodiment, each monitor system 102 may include a GPS receiver and an internal clock that may be synchronized with the internal clocks of each other monitor system 102. For example, the internal clocks may each use an atomic resonance frequency standard as a timekeeping element and the timing of system 100 may be synchronized at least in part through the use of navigational update signals transmitted between monitor systems 102. Some embodiments that use atomic resonance frequency as a time keeping element may be capable of synchronizing the internal clocks of each monitor system 102 to within a few nanoseconds of each other.

In some embodiments, each monitor system 102 may be communicatively coupled to reporting system 106 through one or more networks 105. Networks 105 may each comprise any combination of wireless and/or wireline networks capable of supporting communication between network elements and/or between other components of system 100. For example, network 105 may comprise a radio network (e.g., radio frequency (RF), ultra high frequency network (UHF), etc.), a cellular network, a satellite communications network (e.g., SATCOM, INMARSAT, etc.), a data network (e.g., Enhanced Position Location Reporting System (EPLRS)), a public switched telephone network (PSTN), an integrated services digital network (ISDN), a local area network (LAN), a wide area network (WAN), a metropolitan area network (MAN), all or a portion of a global computer network (e.g., the Internet, the Global Information Grid (GiG), etc.) any combination of the preceding, and/or other communication systems or combination of communication systems at one or more locations.

Each source 104 generally refers to any machines or apparatus capable of transmitting an electromagnetic signal that is detectable by monitor systems 102. For example, at least some of the sources 104 may be GPS satellites that continuously broadcast L-Band Signals-In-Space 103, which may provide Position, Navigation, and Timing (PNT) services. Some other sources 104 may broadcast from land-based, air-based, and/or water-based positions. For example, some sources 104 may transmit from an airplane, a naval vessel, or a land-based radio tower. In the illustrated embodiment, source 104b includes a transmitter capable of broadcasting L-Band signals 103b that may jam or interfere with a portion of the L-Band Signals-In-Space 103a transmitted by one or more GPS satellites 104a to a particular area. The jamming or interference of signals 103a by signals 103b may affect the performance of some devices and/or systems 108 that may be relying on signals 103a. Particular embodiments of system 100 may be able to process data from one or more monitor systems 102 and output information that may be used to locate and/or disable the source 104 of any jamming or interfering signal 103.

Reporting system 106 generally refers to any machines or apparatus capable of receiving information from one or more monitor systems 102. Some reporting systems 106 may be further capable of storing, processing, and/or routing the received information to one or more external processors. Some reporting systems 106 may include one or more transmitters, receivers, processors, software stored on computer-readable media, memory, interfaces, inputs, outputs, data storage devices, and/or any other machines or apparatus capable of processing information received from one or more monitor systems 102. In a particular embodiment, reporting system 106 may include all or a portion of a GPS III ground segment capable of receiving communications over the GiG from a network set of monitor systems 102. In another embodiment, reporting system 106 may form at least a portion of a GPS NAVWAR Operations Center (GNOC). Although FIG. 1 illustrates reporting system 106 and monitor system 102 as separate components, particular embodiments of monitor system 102 may include all or a portion of reporting system 106 and vice versa.

Devices 108 generally refer to machines or apparatus capable of enabling and/or using one or more functions and/or services associated with certain types of signals 103. For example, device 108 may include a GPS receiver capable of receiving signals 103a from a satellite 104a for navigational purposes. In the illustrated example, device 108 is disposed within or coupled to an unmanned aircraft and may be used, for example, to navigate the aircraft along a course and/or attack an enemy. In some alternative embodiments, however, device 108 may be disposed in any of a variety of other vehicles, handheld devices, and/or other stations that may or may not be readily moveable. In addition, device 108 may form at least a portion of any of a variety of other machines or apparatus capable of receiving any of a variety of other types of signals 103.

In operation, particular embodiments of system 100 may be capable of monitoring certain types of signals 103, selecting data that is expected to yield optimal accuracy, estimating locations for the sources 104 of each signal 103, and determining whether one signal 103 is interfering with or otherwise jamming another signal 103. The signals 103 enabling some GPS services are one example of the types of signals 103 that may be monitored by various embodiments of system 100. In response to a detection of any potentially interfering signals 103, system 100 may estimate the location of the corresponding sources 104 and generate a report accordingly. The report may be used, for example, to locate and disable the sources 104 of any signals 103 potentially interfering with a function and/or service associated with system 100. By monitoring for potentially interfering or jamming signals in a manner substantially similar to that described above, various embodiments of system 100 may be capable of optimizing the performance and availability of any of a variety of functions and/or services that may be at least partially enabled and/or used by devices 108. Additional detail regarding the operation of particular embodiments of system 100 is explained further below with reference to FIGS. 2A through 6.

Figure 2A:
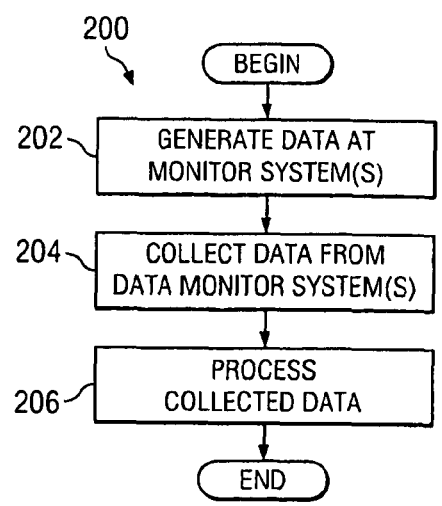
FIGS. 2A and 2B show flowcharts illustrating series of actions that may be taken by various embodiments of the system of FIG. 1 to estimate the location of sources that may be transmitting jamming or interfering signals.
Figure 2B:
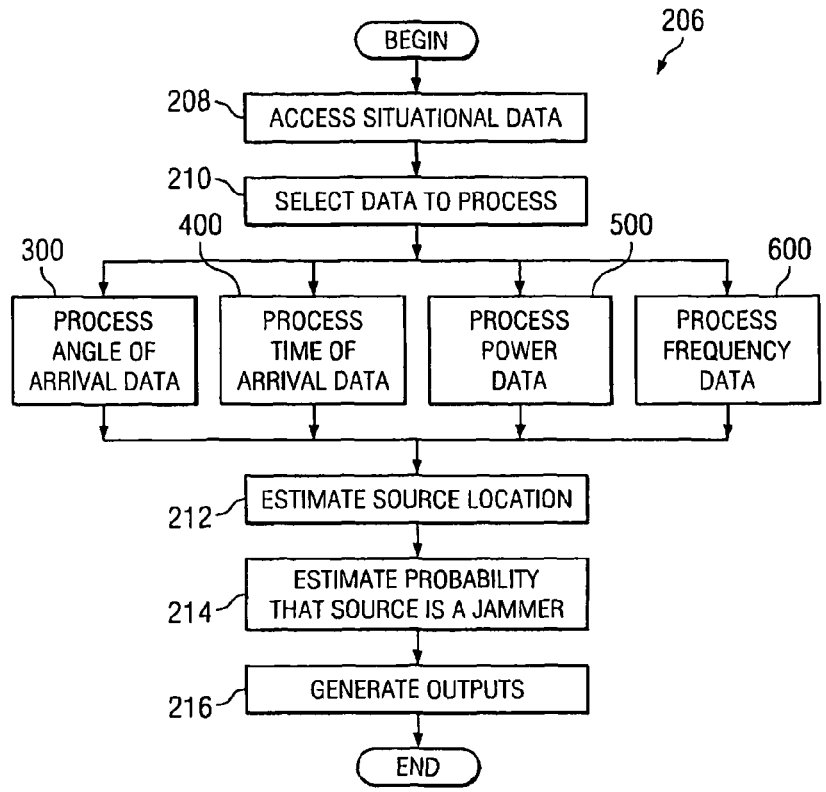

FIGS. 2A and 2B show flowcharts 200 and 206 illustrating a series of actions that may be taken by various embodiments of the system 100 of FIG. 1 to estimate the location of a signal 103 jammer. In this example, the acts of flowchart 200 generally include generating data related to signals 103, collecting the generated data, and processing the collected data.

In act 202, monitor systems 102 may each generate data related to characteristics of signals 103. For example, monitor systems 102 may each generate data related to the power of each signal 103, the angle of arrival, the time of detection, the frequency of each signal 103, any combination of the preceding, and/or some other characteristics of the detected signals 103.

Act 204 includes collecting the data that is generated by monitor systems 102 in act 202. For example, reporting system 106 may receive data transmissions via networks 105 from one or more monitor systems 102 located remotely from the reporting system 106. In some embodiments, reporting system 106 may also or alternatively receive a wireline transmission via a system bus from a local monitor system 102. In particular embodiments, act 204 may also include storing the data collected from one or more monitor systems 102. For example reporting system 102 may store the collected data in storage or memory that is disposed within or accessible to reporting system 106.

Act 206 includes processing the data that is collected from monitor systems 102 by reporting system 106. The data may relate, for example, to the angle of arrival, arrival time, power, and/or frequency of the signals 103 as measured at monitor systems 102. According to one embodiment, the processing is implemented by one or more processors of a computing system capable of executing logic stored on computer-readable media. The processors and/or all or a portion of the logic may be located at, or may be in communication with, reporting system 106. In a particular embodiment, the logic is a software application residing in volatile or non-volatile memory at reporting system 106.

The processing performed in act 206 of FIG. 2A may include additional acts related to automatically selecting at least a subset of the received data, processing the selected data, calculating an estimated location for each source 104, and determining whether a source may be classified as a jammer, as explained further with reference to FIG. 2B.

Referring to FIG. 2B, situational data is accessed in act 208. The situational data may include information related to the area within the detectable range of monitor systems 102. For example, the information may relate to the topography of the physical terrain, a population classification along a spectrum of densely urban to unpopulated, weather, intelligence regarding military units and/or sources 104 that may be located within the area, any combination of the preceding, and/or some other type of information. In a particular embodiment, the situational data may be accessed from the Distributed Common Ground System Integration Backbone (DIB), which is a system through which military analysts and the intelligence communities can collaborate globally.

Act 210 includes automatically selecting at least a subset of the data received in act 204 for processing. In this example, the selection is based on situational information related to physical conditions proximate to monitor systems 102 that may affect the accuracy of the data generated by monitor systems. Some physical conditions may have a greater impact on certain types of data, as explained further below. By selectively filtering (or selectively retaining) certain types of data based on situational information, system 100 may potentially improve the resolution of location solutions for sources 104 and/or the operating efficiency of system 100.

In some embodiments, system 100 may selectively filter out some or all of the time-of-arrival data that may have been collected in act 204. For example, system 100 may determine that signal 103 is periodic in nature (e.g., a sine wave) such that reporting system 106 is unable to sufficiently distinguish between two different, time-separated instances of a particular characteristic or component of a signal 103 measured by a monitor system 102. In addition, system 100 may determine that the available time-of-arrival data collected in act 204 was provided by an insufficient number of monitor systems 102 to be sufficiently meaningful for inclusion in subsequent processing. For example, system 100 may filter out such data if the number of monitor systems 102 providing such data is less than three. In some circumstances, some or all of the time-of-arrival data may be filtered regardless of the number of monitor systems 102 providing such data if the positioning of such monitor systems 102 fails to provide sufficient enough geometric separation for the data to be sufficiently meaningful. Insufficient horizontal and/or vertical separation of monitor systems 102 may also affect other types of data including, for example, power data.

In particular embodiments, some or all of the data may have limited applicability in some urban environments where multi-path effects may result in false measurements. Such environments may have greater effects on certain types of data. For example, multi-path effects may be more of a problem with angle-of-arrival data and/or time-of-arrival than with power or frequency data.

Certain environmental factors may affect the accuracy of the data provided by monitors 102. For example, RF propagation loss may be affected by the weather in a manner that corrupts some of the power data that may have been provided by monitors 102.

If system 100 determines, based at least partially on any of the above example circumstances or any of a variety of other circumstances, that the use of some data may only marginally improve the accuracy of location solutions for sources 104 or may risk decreasing the accuracy of such solutions, system 100 may selectively filter out some or all this data in act 210. In some embodiments, however, system 100 may determine that there is minimal risk of marginalizing the location solutions by including such information. In addition, system 100 may determine it has sufficient bandwidth to process a larger dataset even if some of the data may only marginally improve the accuracy of location solutions for sources 104. Such example determinations and/or any of a variety of other determinations may affect the composition of the dataset selected in act 210.

The composition of the dataset selected in act 210 may affect the type of processing that may be performed in other acts. In the illustrated embodiment of FIG. 2B, for example, the data processing acts are partitioned according to the type of data included in the dataset. The selected angle-of-arrival data is processed in act 300, the selected time-of-arrival data is processed in act 400, the selected power-related data is processed in act 500, and the selected frequency-related data is processed in act 600. According to one embodiment, the details of the processing performed in acts 300, 400, 500, and 600 are described in greater detail below with reference to FIG. 3A-3B, FIG. 4, FIG. 5, and FIG. 6, respectively. Thus, in some embodiments system 100 may automatically select any suitable combination of acts from among the example acts described below with reference to FIGS. 3A through FIG. 6. This automatic selection, which may be based in part on the situational awareness processing described with reference to act 210, may optimize the accuracy and/or efficiency associated with estimating the location of sources 104.

Referring again to FIG. 2B, the locations of sources 104 are estimated in act 212. In this example, the selected data used to estimate the locations of sources 104 may include all or a portion of the data collected in act 204. According to one embodiment, act 212 may include integrating and/or otherwise combining the results obtained by performing acts 300, 400, 500 and/or 600, which are each related to processing respective data types to estimate the locations of sources 104.

In a particular embodiment, the execution of acts 300, 400, 500, and/or 600 may result in the generation of respective maps each having multiple grid points. Each grid point of the map(s) may be assigned a value indicating the probability that the source 104 of a particular signal 103 is located at that grid point. If multiple virtual probability maps are generated, the data may be combined or integrated, for example, by multiplying each grid point by the corresponding grid point(s) of the other map(s). In various embodiments, some types of data may be weighted more heavily than other types of data. The weighting of data may depend, for example, on the relative amount of available data, the estimated accuracy of the data, any of the factors explained previously with reference to act 210, and/or any of a variety of other factors. System 100 may determine that the grid position with the highest probability value is the approximate location of the source 104 transmitting jamming or interfering signals 103. In some embodiments, the processing performed in act 212 may also include one or more optimization acts that may be used, for example, to fine-tune the estimated location of sources 104. The fine-tuning may include, for example, reducing the size of the grid points and reprocessing the selected dataset, or some other reselected dataset, by (re)performing acts 300, 400, 500, and/or 600.

The grid maps that may be used to perform at least a portion of the processing of act 210 may have any suitable number of dimensions. For example, some grid maps may include multiple positions digitally disposed on a two-dimensional plane. Some other grids may include Earth-centered rotational coordinates (e.g., a rotating Cartesian coordinate system). Still other grids may include latitude, longitude, and height (e.g., a rotating spherical or coordinate system). Although the Earth looks like a sphere from a distance, it has a significant equatorial bulge. Particular embodiments may thus model the Earth as an ellipsoid with eccentricity as $e=\sqrt{R_E^2-R_p^2}/R_E$.

Act 214 includes calculating a probability for each located source 104 that the source 104 is a jammer. According to one embodiment, the probability may be calculated at least in part by comparing the estimated location of each source 104 to the locations of sources 104 that may be transmitting expected signals 103. The probability that a particular source 104 is a jammer may be greater, for example, if the source 104 is estimated located at a position removed from locations where service-enabling signals 103 are typically transmitted. In another example, system 100 may calculated the probability that the source 104 is a jammer by measured components signatures of signal 103. For example, system 100 may calculate the probability based at least partially on the frequency, power, turn-on transient, and/or any of a variety of other signal 103 components or signatures.

In act 216, one or more outputs are generated. The outputs may be based at least in part on the data processing performed in any suitable combination of acts 208 through 214. For example, the generated outputs may include a graphical display of the processing results overlaid on a map. The graphical display may include, for example, various icons representing the geospatial locations of monitor systems 102 and the estimated location of sources 104. In some alternative embodiments, the output generated in act 216 may include numerical and/or color-coded indications of the probability that each position of the grid is the location of source 104. Some graphical displays may include lines or vectors representing various pieces of information, such as, for example the angle-of-arrival data as measured at various monitor systems 102. The outputs generated in act 216 may be exported as overlays onto external mapping tools (e.g., Google Earth) or may be used to provide a stand-alone GPS Situational Awareness Map.

In a particular embodiment, systems 100 may track the motion of a moving source 104 using at least the acts described with reference to FIG. 2B. The output provided by such systems 100 in act 216 may include, for example, an estimated future location of the moving source 104.

Thus, in the illustrated embodiment, system 100 automatically selects a subset of the data provided by monitor systems 102. The selection may be based in part on a situational awareness derived from physical conditions proximate to the monitor systems 102 and/or the geometric distribution or layout of the monitor systems 102. Selecting a subset of the data in this manner may enhance the accuracy of location solutions for sources 104 and/or the operational efficiency of system 100. The selected data subset may be processed such that the outputs obtained from various different types of data may be mathematically combined. Using the combined results, the locations of each source 104 may be efficiently estimated with a high degree of accuracy. Based partially on the estimated locations of sources 104, system 100 may be capable of determining whether or not each source 104 is a jammer that is transmitting jamming or interfering signals 103. Referring again to FIG. 1, for example, system 100 may be capable of locating jammers 104*b* used by enemy combatants and distinguishing the jamming signal 103*b* transmitted by such jammers 104*b* from another signal 103*a* emitted by a satellite 104*a* or some other source 104.

In the illustrated embodiment of FIG. 2B, the data processed by system 100 to locate jamming or interfering sources 104 may at least include the following types of data: angle-of-arrival data, time-of-arrival data, power-related data, frequency-related, or any suitable combination thereof. The selected angle-of-arrival data is processed in act 300, the selected time-of-arrival data is processed in act 400, the selected power-related data is processed in act 500, and the selected frequency-related data is processed in act 600. Additional detail regarding various example actions that may be performed in acts 300, 400, 500, and 600 by particular embodiments are explained further below with reference to FIGS. 3A-3B, 4, 5, and 6, respectively.

Figure 3A:
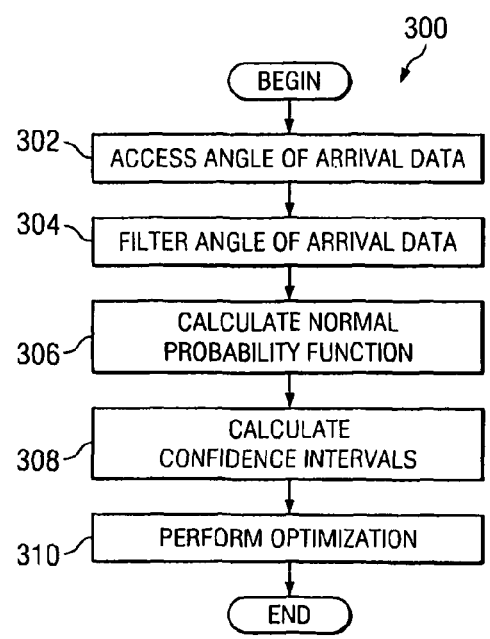
FIG. 3A shows a flowchart illustrating example actions that may be performed to process data related to the angle of arrival of a jamming or interfering signal as determined by particular embodiments of the system of FIG. 1.

FIG. 3A shows a flowchart illustrating example actions that may be performed in act 300 of FIG. 2B to process data related to the angle of arrival of signal 103 as determined at monitor systems 102. Some systems 100 may be capable of using angle-of-arrival data provided by only one monitor system 102 to determine a vector where signal 103 is the strongest. This vector may be used by system 100 in conjunction with other types of data to more accurately determine a location of the source 104. If multiple monitor systems 102 provide angle-of-arrival data for a jamming or interfering signal 103, however, this data may be used to triangulate an approximate geospatial location of the source 104 regardless of whether or not other types of data is also made available. In the illustrated embodiment, the acts of FIG. 3A generally include using at least the angle-of-arrival data provided by multiple monitor systems 102 to calculate the probability that each position in a particular geospatial grid includes the location of a source 104 transmitting jamming or interfering signals 103.

In various embodiments, at least some of the example acts of FIG. 3A may be implemented by one or more processors executing software embodied in computer-readable media. For example, at least some of the software may include one or more programs written in Matlab; however, any suitable programming language may be used including, for example, future programming languages. FIG. 3B shows a table listing example data files and their corresponding inputs, variables, and/or descriptions that may be used by various software programs in the execution of at least some of the example acts of FIG. 3A according to one embodiment.

In act 302, any relevant and available angle of arrival (AOA) data is accessed. For example, act 302 may include accessing one or more data files stored in computer-readable media. The data files may include, for example, any angle-of-arrival data that may have been collected in act 202 and/or information related to the location of each monitor system 102. In some embodiments, at least a portion of the data accessed in act 302 may be collected and stored in tabular format, such as, for example, in a Microsoft Excel file. According to a particular embodiment, at least some of the programming code that may be executed in act 302 to save and/or access angle-of-arrival data, monitor system 102 location data, and/or source 104 location data may be substantially similar, at least in function, to some or all of the example code that follows.

```
saveGPSData.m

% Read in all the necessary information for the GPS scenario
% and save off for repeated use. Read info from Excel file
    clear all; clc;
    filename = 'MS_latest.xls';
    sheet = 'MS great circle distance';
% Angle of Arrival (AOA) for all monitor systems 102
    theta1 = xlsread(filename,sheet,'C25:C324');
    theta2 = xlsread(filename,sheet,'E25:E324');
    theta3 = xlsread(filename,sheet,'G25:G324');
    theta4 = xlsread(filename,sheet,'AP25:AP324');
% True bearing
    tb = xlsread(filename,sheet,'B23:D23'); % True bearing
% Jammer location
    jam = xlsread(filename,sheet,'B6:B8'); % jammer location
    jam(1) = jam(1)*180/pi; % latitude
    jam(2) = jam(2)*180/pi; % longitude
    jam(3) = jam(3)*1609.344; % altitude
% Location information for stationary monitor systems 102
    loc = xlsread(filename,sheet,'B2:D4');
    MS = xlsread(filename,sheet,'B2:D4');
% Location information for mobile monitor systems 102
    mloc = xlsread(filename,sheet,'O25:Q324');
% Save off data in preferred format. Convert to Google Earth
% coordinates for stationary monitor system 102
    loc(1,:) = loc(1,:)*180/pi; % latitude
    loc(2,:) = loc(2,:)*180/pi; % longitude
    loc(3,:) = loc(3,:)*1609.344; % altitude
    fm = loc;
% Then each row contains a monitor system 102 position
% Convert to Google Earth coordinates for mobile monitor
% system 102
    mloc(:,1) = mloc(:,1)*180/pi; % latitude
    mloc(:,2) = nriloc(:,2)*180/pi; % longitude
    mloc(:,3) = mloc(:,3)*1609.344; % altitude
    ml = [ mloc(:,2) mloc(:,1) mloc(:,3) ];
% Store all monitor system 102 locations information in x,y,z
    x=[fm(1,2)*ones(length(m1),1) fm(2,2)*ones(length(m1),1) ...
        fm(3,2)*ones(length(m1),1) mloc(:,2)];
    y=[fm(1,1)*ones(length(m1),1) fm(2,1)*ones(length(m1),1) ...
        fm(3,1)*ones(length(ml),1) mloc(:,1)];
    z=[fm(1,3)*ones(length(m1),1) fm(2,3)*ones(length(m1),1) ...
        fm(3,3)*ones(length(ml),1) mloc(:,3)];
% Convert angle of arrival to radians
    theta = deg2rad([theta1 theta2 theta3 theta4]);
    clear theta1 theta2 theta3 theta4;
    save gps_data
```

In act 304, the angle-of-arrival data may be filtered. In some embodiments, filtering the data may minimize the effects of independent measurement errors of some monitor systems 102 and/or the effects of signal noise. The data may be filtered in act 304 using any of a variety of mechanical, electrical, and/or algorithmic signal processing. For example, the data collected from each monitor system in act 204 may be averaged over a particular time interval (e.g., 0.5 seconds, 1 second, 5 seconds, 10 seconds, etc.). The data may then be randomized using a normal distribution with an error function calibrated to align with the angular resolution of a receiver of monitor systems 102. According to a particular embodiment, at least some of the programming code that may be executed in act 304 to at least partially filter the angle-of-arrival data may be substantially similar, at least in function, to some or all of the example code that follows.

```
% Average data over 10s intervals
    x = deg2rad(x);
    y = deg2rad(y);
    act = 10;
```

-continued

```
        % Use the mean of measurements over act (second) intervals
        for i = 1:floor(length(theta)/act)
            t(i,:) = mean(theta(10*(i−1)+1:(101),:));
            xx(i,:) = mean(x(10*(i−1)+1:(10*i),:));
            yy(i,:) = mean(y(10*(i−1)+1:(10*1),:));
            zz(i,:) = mean(z(10*(i−1)+1:(10*i),:));
        end
        clear theta x y z;
        x = xx;
        y = yy;
        z = zz;
        theta = t;
        clear t;
    % Set up variables. Assume std dev of 0.5 degrees for
    % stationary monitor system 102, then take the mean over act
    % samples, so divide by sqrt(act)
        sigma = deg2rad([0.5 0.5 0.5 0.5])/sqrt(act);
        m = length(theta);
        output ='';
```

In act 306, a normal probability distribution function (PDF) is calculated for each angle of arrival measurement provided by each monitor system 102. Each normal probability function may use variance that depends on respective angle-of-arrival data. If angle-of-arrival data is made available from multiple monitor systems 102, a combined probability distribution function may be determined in act 306 by calculating the product of the probability distribution functions calculated for each of the monitor systems 102. According to a particular embodiment, at least some of the programming code that may be executed in act 306 to calculate probability distribution functions may be substantially similar, at least in function, to some or all of the example code that follows.

```
findPDF.m
% Creates a meshgrid and evaluates the normal PDF to determine
% the likelihood that each point in the grid is the GPS jammer
% using the AoA data. Saves the data into a Matlab data file.
    function findPDF(data, xdelta, savedata)
% Load GPS data
    load(data);
% Set up meshgrid for PDFs
    xgrid = 57:xdelta:57.3;
    ydelta = .3/length(xgrid);
    ygrid = 26.6:ydelta:26.9−ydelta;
    PDF = zeros(length(xgrid),length(ygrid));
    start = cputime;
    for i = 1:m
        Zi = ones(length(xgrid),length(ygrid));
        for j = 1:4
            NP = [ 0 0 6356752.31424518];
            [xf yf zf] =lla2ecef(y(i,j), x(i,j), 0);
            F = [xf yf zf];
            n = normalVector(F, [0 0 0],NP);
            f = ( 111.32 + 0.373*( sin((y(i,j)))^2 )*...
                cos((y(i,j)) ) / 111.32;
            center = [ sin(theta(i,j)) f*cos(theta(i,j)) 0];
            % Create pdf using a normal distribution with variance
            % that depends on the angle of arrival
            for k = 1:length(xgrid)
                for l = 1:length(ygrid)
                    x0=[deg2rad(xgrid(k))−x(i,j)...
                        deg2rad(ygrid(l))−y(i,j) 0];
                    test=...
                        acos(dot(x0,center)/
                        (norm(x0)*norm(center)));
                    if test < 6*sigma(j)
                        [xb yb zb] = lla2ecef(deg2rad(ygrid(l)), ...
                            deg2rad(xgrid(k)), 0);
                        J = [xb yb zb];
                        b = F − J;
                        d(l,k)=asin(dot(n,b)/norm(n)/norm(b))−...
                            theta(i,j);
```

```
                        Z(1,k)=1/(sigma(j)*sqrt(2*pi))*...
                            exp(−(d(1,k)^2)/(2*Sigma(j)^2));
                    else
                        Z(l,k) = 0;
                    end
                end
            end
            Zi = Zi.*Z;
            clear Z;
        end
        if sum(sum(Zi)) > 0
            Zi = Zi / (sum(sum(Zi)) * xdelta * ydelta);
        end
        PDF = PDF + Zi/m;
        clear Zi;
        t(i) = cputime − start
    end
    stop = cputime − start
    clear data;
    save(savedata);
deg2rad.m
    function [angle_rad]=deg2rad(angle_deg)
        angle_rad=(angle_deg*2*pi)/360;
lla2ecef.m
% LLA2ECEF - convert latitude, longitude, and altitude to
%            earth-centered, earth-fixed (ECEF) Cartesian coordinates
% USAGE:
% [x,y,z] =lla2ecef(lat,lon,alt)
%
% x = ECEF X-coordinate (m)
% y = ECEF Y-coordinate (m)
% z = ECEF Z-coordinate (m)
% lat = geodetic latitude (radians)
% lon = longitude (radians)
% alt = height above WGS84 ellipsoid (m)
% Although this example function assumes the WGS84 model, any
% suitable model may be used.
% Latitude is customary geodetic in this example; however,
% any suitable latitude type may be used (e.g., geocentric).
    function [x,y,z]=lla2ecef(lat,lon,alt)
% WGS84 ellipsoid constants:
    a = 6378137;
    e = 8.1819190842622e−2;
% intermediate calculation
% (prime vertical radius of curvature)
    N = a ./ sqrt(1 − e^2 .* sin(lat).^2);
% results:
    x = (N+alt) .* cos(lat) .* cos(lon);
    y = (N+alt) .*cos(lat) .* sin(lon);
    z = ((1−e^2) .* N + alt) .* sin(lat);
normalVector.m
% Given three points x, y, and z specifying a plane, find the
% unit normal vector to the plane. If x, y, and z are on the
% face of a polygon, these will be the outward pointing normal
% vectors
    function n =normalVector(x, y, z)
        xy = −[(x(1)−y(1)) x(2)−y(2) x(3)−y(3)];
        xz = [(x(1)−z(1)) x(2)−z(2) x(3)−z(3)];
        n = cross(xy,xz);
        n = n/norm(n);
```

In act 308, a probability is calculated for one or more positions of a geospatial grid representing the area surrounding monitor systems 102. Each calculated probability may represent the likelihood that any given position represents the geospatial location of the source 104 that is transmitting jamming or interfering signals 103. For example, the data may be integrated over at least a portion of a geospatial grid area to find confidence intervals. In some embodiments, the probabilities calculated in act 308 may be in the form of confidence contours that may be displayable on a digital map, such as, for example, at least a portion of a digital map made available by Internet accessible Google Earth software. According to a particular embodiment, at least some of the programming code that may be executed in act 308 to calculate confidence contours may be substantially similar, at least in function, to some or all of the example code that follows.

```
drawConfidenceContours.m
% Draw confidence contours given a data set and a list of
% confidence levels
    function v = drawConfidenceContours(data,levels)
        load(data);
% Find where to place contours
    for i = 1:length(levels)
        v(i) = findContour(levels(i), PDF, xdelta, ydelta);
    end
    [X,Y] = meshgrid(xgrid,ygrid);
    [C,h] = contour(X,Y,PDF,v,'linewidth',2);hold on;grid on;
    output = [ge_contour_int(X,Y,PDF,v,'name', ...
        'Confidence intervals','lineWidth',1,'lineColor',...
        '#ffffffff')];
% Graph actual location of jammer
    t = 0:.2:2*pi;
    a = .0005;
% Create output for Google Earth
    output = [output,ge_plot3([jam(2)+a*cos(t)],...
        [jam(1)+a*sin(t)], [jam(3)*ones(size(t))],'extrude',0,...
        'altitudeMode','relativeToGround','lineColor',...
        '#ff0000ff','lineWidth',5,'name','Jammer')];
    for i = 1:3
        output = [output,ge_plot3([rad2deg(x(1,0))+a*cos(t)],...
            [rad2deg(y(1,0))+a*sin(t)],[(z(1,i))*ones(size(t))],...
            'extrude',0,'altitudeMode','relativeToGround',...
            'lineColor','#ffff0000','lineWidth',5,'name',...
            ['FMS ',num2str(i)])];
    end
    for i = 1:length(x)
        output = [output,ge_plot3([rad2deg(x(i,4))+a*cos(t)],...
            [rad2deg(y(i,4))+a*sin(t)],...
            [rad2deg(z(i,4))*ones(size(t))],'extrude',0,...
            'altitudeMode','relativeToGround',lineColor', ...
            '#ffff0000','lineWidth',5,'name','FMS 4')];
    end
    plot3(jam(2),jam(1),0,'*r');
% Plots jammer location on Matlab map
    plot3(jam(2),jam(1),0,'or');
% Output to GoogleEarth file
    ge_output([data,'_contours.kml'],output);
    clear output;
findContour.m
    function v = findContour(p, PDF, xdelta, ydelta)
    t = .005; % how close we have to be to p
    [i,j,V]=find(PDF);
    my = (mean(V));
    v = mv;
    s = 0;
    count = 0;
    while( abs(s-p)>t & count < 2000)
        count = count + 1;
        [i,j] = find(PDF > v );
        s = 0;
        for k =1:length(i)
            s = s + PDF(i(k),j(k));
        end
        s = s*xdelta*ydelta;
        if abs(s-p) < t
            return;
        elseif s > p
            v = v + (s-p)*mv;
        else
            v = v + (s-p)*mv;
        end
    end
    if count==2000
        disp('contour may lack precision!!! doublecheck!!');
        disp(['p=',num2str(p),' s=',num2strs]);
    end
```

In act 310, optimization may be performed. For example, one or more iterations of act 308 may be performed on at least a portion of the grid using incrementally reduced grid sizes and/or grid divisions. In some embodiments, any multiple-path effects that may result from such iterations may or may not be ignored.

In particular embodiments, the output that may be generated in act 216 of FIG. 2B at least partially as a result of one or more of the example processing acts 302-310 may include, for example, a graphical display of the results overlaid on a map. The graphical display may include, for example, lines or vectors representing the angle-of-arrival data and/or various icons representing the geospatial locations of monitor systems 102 and the estimated location of the source 104 transmitting jamming or interfering signals. According to a particular embodiment, at least some of the programming code that may be executed in act 216 to display the confidence contours that may have been generated in act 308 may be substantially similar, at least in function, to some or all of the example code that follows.

```
qe contour int.m
    function [output] = ge_contour_int(x,y,data,v,varargin )
%% ge_contour_int(x, y, data, v, varargin)
% x, y, v, & data are used the same as the contour function
% AuthorizedOptions =
%                    {'id','idTag','name','timeStamp',...
%                    'timeSpanStart','timeSpanStop','description', ...
%                    'visibility','lineWidth','lineColor','altitude', ...
%                    'extrude','tessellate', 'altitudeMode','snippet'};
    AuthorizedOptions = {'id','idTag','name','timeStamp',...
                    'timeSpanStart','timeSpanStop','description', ...
                    'visibility','lineWidth','lineColor','altitude', ...
                    'extrude','tessellate', 'altitudeMode','snippet',...
                    'msgToScreen','forceAsLine'};
    id = 'default_contour';
    idTag = 'id';
    name = 'ge_contour_int';
    timeStamp = ' ';
    timeSpanStart = ' ';
    timeSpanStop = ' ';
    description = ' ';
    visibility = 1;
    lineColor = 'FFFFFFFF';
    lineWidth = 0.0;
    snippet = ' ';
    altitude = 1.0;
    extrude = 0;
    tessellate = 1;
    altitudeMode = 'relativeToGround';
    msgToScreen = false;
    forceAsLine = true;
    parsepairs
% example script that parses Parameter/value pairs.
    if msgToScreen
        disp(['Running' mfilename '...'])
    end
    if (isempty(x) || isempty(y) || isempty(data) )
        error('empty coordinates passed to ge_contour(... ).');
    end
    if ~(isequal(altitudeMode,'clampToGround') ||...
        isequal(altitudeMode,'relativeToGround') ||...
        isequal(altitudeMode,'absolute'))
        error(['Variable ',39,'altitudeMode',39,...
            ' should be one of ',39,'clampToGround',39,', ',10,...
            39,'relativeToGround',39,', or',39,'absolute',39,'.'])
    end
    C =contourc(x,y,data,v);     % C = contourc(x,y,data);
    if altitude <= 0
        altitude =1.0;
        disp('Resetting altitude to 1.0.')
    end
    i = 1;
    X = C(1,:);
    Y = C(2,:);
    while( i < length(C) )
        X(i)=NaN;
        Y(i)=NaN;
        count = floor(C(2.i));
        i = i+count+1;
    end
    output=ge_plot(X,Y,'id',id,'idTag',idTag,'name',name, ...
        'description',description,'timeStamp',timeStamp, ...
        'timeSpanStart',timeSpanStart,...
```

-continued

```
qe contour int.m
```

```
        'timeSpanStop',timeSpanStop,'visibility',visibility, ...
        'lineColor',lineColor,'lineWidth',lineWidth, ...
        'altitude',altitude, 'altitudeMode',altitudeMode, ...
        'extrude',extrude,'tessellate',tessellate, ...
        'forceAsLine',forceAsLine);
    if msgToScreen
        disp(['Running ' mfilename '...Done'])
    end
```

Various factors may contribute to the accuracy of an estimated location for source 104. For example, an estimated location for source 104 that is based entirely or significantly on angle-of-arrival data may have significant error if monitor systems 102 are placed too close together or too far apart, if source 104 is located too far from monitor systems 102, and/or if source 104 is located directly between monitor systems 102. In addition, some jamming or interfering signals 103 may be deflected by obstacles, such as mountains or buildings, which may introduce additional error into location estimates based entirely or significantly on angle-of-arrival data. Accordingly, the processing performed in act 206 may involve any of a variety of other data types in addition to or instead of angle-of-arrival data.

Figure 4:
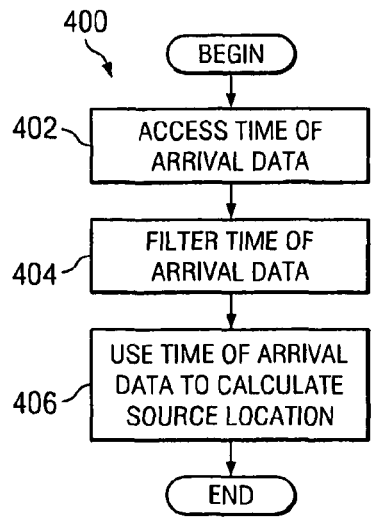
FIG. 4 shows a flowchart illustrating example actions that may be performed to process data related to the relative arrival times of a jamming or interfering signal as determined by particular embodiments of the system of FIG. 1.

FIG. 4 shows a flowchart illustrating example actions that may be performed in act 400 of FIG. 2B to process data related to the relative arrival times of signal 103 as determined at monitor systems 102. The differences in the distance that signal 103 travels to reach monitor systems 102 will generally cause a time difference in the arrival of particular characteristics of signal 103. Some jamming or interfering signals 103 may have one or more signatures or characteristics that may be uniquely identified by monitor systems 102. For example, the unique signatures or characteristics of some signals 103 may include a turn-on transient, a power spike or pattern, particular voice components or sound bytes, particular data transmissions, or any of a variety of other types of uniquely identifiable signatures or components. If each monitor system 102 generates a time stamp for these unique signatures or characteristics, the differences in these time stamps as determined at various monitor systems 102 may be used in estimating an approximate location for source 104. According to a particular embodiment, each monitor system 102 may include one or more respective GPS receivers. The GPS receivers of some monitor systems 102 may be capable of accurately synchronizing their timing and/or accurately determining time stamps to within a few nanoseconds or less (e.g., 10 nanoseconds, 5 nanoseconds, 3 nanoseconds, 2 nanoseconds, 1 nanosecond, 0.5 nanosecond, a length of time between any two of these example durations, etc.). As light travels approximately one foot per nanosecond, various embodiments may be capable of using data related to the time-of-arrival differences of particular signal 103 characteristics to estimate a location for source 104 that is accurate to within a few feet, one foot, or less than twelve inches.

In this example, the acts shown in FIG. 4 generally include using at least the arrival-time data of signal 103 as determined at three or more monitor systems 102 to estimate the position of a source 104 transmitting jamming or interfering signals 103; however, various embodiments may use time-of-arrival data provided by more or less than three monitor systems 102. This example assumes monitor systems 102 and source 104 are each located at or near the surface of a spherical Earth; however, source 104 and/or monitor systems 102 may be located above the Earth's surface and some alternative embodiments may use any of a variety of other assumptions or no assumptions at all.

In act 402, any relevant data collected in act 202 that is related to the timing of various identifiable components of signal 103 may be accessed. For example, act 402 may include accessing one or more data files stored in computer-readable media. In some embodiments, at least a portion of the arrival-time data may be collected and stored in tabular format, such as, for example, in a Microsoft Excel file.

In act 404, the timing data may be filtered. In some embodiments, filtering the data may minimize the effects of independent measurement errors of some monitor systems 102 and/or the effects of signal noise. The data may be filtered in act 404 using any of a variety of mechanical, electrical, and/or algorithmic signal processing.

In this particular example, act 406 includes performing one or more calculations using at least the time-of-arrival data provided by at least three monitor systems 102. The results of these calculations may be used in estimating the location of source 104. According to a particular embodiment, the calculations performed in act 406 may be based at least partially on one or more equations substantially similar to the examples provided in the following paragraphs.

Let at least three monitor systems 102 be located at respective positions identified as $x_1=(x_{1,1}, x_{1,2}, x_{1,3})$, $x_2=(x_{2,1}, x_{2,2}, x_{2,3})$, and $x_3=(x_{3,1}, x_{3,2}, x_{3,3})$. Let the location of source 104 be represented as $t=(t_1, t_2, t_3)$. Let $\tau_k$ be the measured time delay of some characteristic of signal 103 received at the $k^{th}$ monitor system 102. Then the measured distance $d_k=\hat{c}\,\tau_k$ where $\hat{c}$ is the speed of signal 103 in the lower atmosphere (roughly 0.997 of the speed of light in a vacuum).

Some signals 103, such as, for example GPS signals 103, may not be reflected by the ionosphere, but such signals 103 may travel limited distances over the horizon via atmospheric refraction. For a spherical Earth, the measured angular separation between source 104 and the $k^{th}$ monitor system 102 with respect to the Earth's center may be represented as $\theta_k=d_k/R$ where R is the local radius of the Earth and θ is a constant representing the difference between the actual angular separation and the measured angular separation for all monitor systems 102.

This example assumes the $k^{th}$ monitor system 102 and the source 104 are positioned on the ground of a spherical Earth. For any given $k^{th}$ monitor system 102 the relationship may be represented as follows:

$$\theta_k - \theta = a\cos\frac{\langle x_k, t\rangle}{\|x_k\|\|t\|}$$

$$\Rightarrow x_{k,1}t_1 + x_{k,2}t_2 + x_{k,3}t_3 + R^2\cos(\theta_k - \theta) = R^2(\cos\theta_k\cos\theta + \sin\theta_k\sin\theta).$$

Taking the cosine of an equation may, in some instances, introduce extraneous solutions, which may be filtered out at some point. The respective measurements of three monitor systems may be represented in matrix format as $$\begin{bmatrix} x_{1,1} & x_{1,2} & x_{1,3} \\ x_{2,1} & x_{2,2} & x_{2,3} \\ x_{3,1} & x_{3,2} & x_{3,3} \end{bmatrix}\begin{pmatrix} t_1 \\ t_2 \\ t_3 \end{pmatrix} = R^2\cos\theta\begin{pmatrix} \cos\theta_1 \\ \cos\theta_2 \\ \cos\theta_3 \end{pmatrix} + R^2\sin\theta\begin{pmatrix} \sin\theta_1 \\ \sin\theta_2 \\ \sin\theta_3 \end{pmatrix}$$

Let X be the matrix and let C and S be two vectors. We then have $$Xt = R^2(\cos\theta\, c + \sin\theta\, s) \Rightarrow t = R^2((\cos\theta)X^{-1}c + (\sin\theta)X^{-1}s) = \cos\theta\, u + \sin\theta\, v$$

where $u \equiv R^2 X^{-1} c$ and $v \equiv R^2 X^{-1} s$. If source 104 is on the surface of a spherical Earth, it follows that $$\begin{aligned}R^2 &= \|t\|^2 \\ &= \|\cos\theta u + \sin\theta v\|^2 \\ &= \cos^2\theta \|u\|^2 + 2\cos\theta\sin\theta\langle u, v\rangle + \sin^2\theta\|v\|^2 \\ &= \frac{1+\cos(2\theta)}{2}\|u\|^2 + \sin(2\theta)\langle u,v\rangle + \frac{1-\cos(2\theta)}{2}\|v\|^2\end{aligned}$$

Simplifying gives $2R^2 - \|u\|^2 - \|v\|^2 = (\|u\|^2 - \|v\|^2)\cos(2\theta) + 2\langle u, v\rangle \sin(2\theta)$, which may be further simplified using a cos $\alpha + b \sin \alpha = \sqrt{a^2 + b^2} \cos(\alpha - \arctan 2(b,a))$ as follows:

If $A < |2R^2 - \|u\|^2 - \|v\|^2|^2$, there are four non-periodic solutions for $\theta$. Let $$\gamma = \arccos\left(\frac{A}{2R^2 - \|u\|^2 - \|v\|^2}\right)$$

Then we have $$2\theta - \phi \in \{\gamma, 2\pi - \gamma, 2\pi + \gamma, 4\pi - \gamma\} \Rightarrow \theta \in \phi + \{\gamma/2, \pi - \gamma/2, \pi + \gamma/2, 2\pi - \gamma/2\}$$

Thus, an estimated approximate location for source 104 may be determined, in accordance with a particular embodiment, using the simplified equation $t = \cos\theta\, u + \sin\theta\, v$. In this particular example, therefore, the processing performed in act 406 may include solving for location t in the above equation to determine an estimated position of source 104 on the surface of a hypothetically spherical Earth; however, any of a variety of alternative processing may be performed in act 406 that may based at least in part on any of a variety of other equations and/or assumptions.

Figure 5:
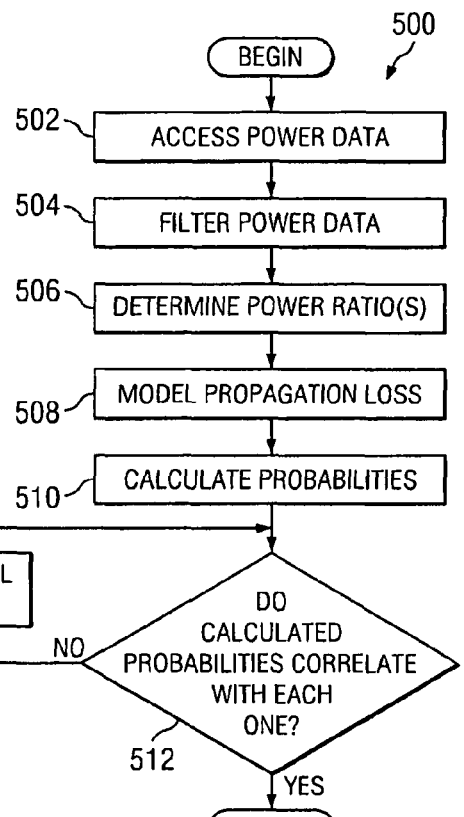
FIG. 5 shows a flowchart illustrating example actions that may be performed to process data related to the relative power differences of a jamming or interfering signal as determined by particular embodiments of the system of FIG. 1.

FIG. 5 shows a flowchart illustrating example actions that may be performed in act 500 of FIG. 2B to process data related to the power of signal 103 as determined at monitor systems 102. As explained further below, the strength of signal 103 measured at any given monitor system 102 is generally a function of the square root of the distance between the monitor system 102 and the source 104. One or more power measurements may thus be used, at least in part, in estimating the location of a source 104 transmitting jamming or interfering signals 103. In this example, the acts shown in FIG. 5 generally include determining power-ratio data by comparing the power measurements of a signal 103 as measured different monitor systems 103, modeling signal 103 propagation loss, and using these values to calculate the probability that each position of a particular geospatial grid represents the location of a source 104 transmitting jamming or interfering signals 103.

In act 502, any relevant data collected in act 202 that is related to the power of signal 103 may be accessed. For example, act 502 may include accessing one or more data files stored in computer-readable media. In some embodiments, at least a portion of the power data may be collected and stored in tabular format, such as, for example, in a Microsoft Excel file.

In act 504, the power data may be filtered. In some embodiments, filtering the data may minimize the effects of independent measurement errors of some monitor systems 102 and/or the effects of signal noise. The data may be filtered in act 504 using any of a variety of mechanical, electrical, and/or algorithmic signal processing. For example, a normal distribution function may be applied to the power data in act 504. In this example, at least some of the noise in the power measurements received at each monitor system 102 may be filtered by determining the mean of a given number of data samples collected at the monitor system 102 (e.g., 60 samples, 250 samples, 300 samples, 500 samples etc.) and/or the mean of the data samples collected at the monitor system 102 over a given time period (e.g., 1 second, 5 seconds, 10 seconds, 20 seconds, etc.).

In act 506, power ratios are determined. For example, the power data provided by two or more monitor systems 102 may be compared to each other. In some embodiments, this comparison may be repeated such that the power data provided by each monitor system 102 is compared to each other monitor system 102. In a particular embodiment, the power ratio between a pair of monitor systems 102 may be determined using their respective power means calculated in act 504.

In act 508, radio frequency (RF) propagation loss may be modeled for each position of a grid representing the geospatial area surrounding each monitor system 102. That is, each position may be assigned respective values representing theoretical RF propagation losses. In a particular embodiment, each modeled propagation loss value may represent the power ratio of a signal 103 expected to be measured by each of a pair of monitor systems 102 if source 104 happened to be located at that position. At least theoretically, if a first monitor system 102 measures twice the signal power of a second identical monitor system 102, then the first monitor system may be approximately 1.41 times closer (assuming the power of signal 103 drops off as a square of the distance). More sophisticated models may be used, however, to account for various types of terrain, differences in monitor systems, the curvature of the earth, and/or any of a variety of other factors.

In a particular embodiment, RF propagation loss may be modeled in act 508 at least in part using a Terrain-Integrated Rough-Earth Model in combination with a Spherical Earth Model that may or may not factor rough terrain (TIREM/SEM); however, any suitable propagation loss model or combination of models may be used. In some embodiments, the results of the model calculations performed in act 508 may depend substantially on the location of monitor systems 102 with respect to each other and/or their relative capabilities of measuring the power of signal 103. Thus, act 508 may include retrieving from data storage the results of prior model calculations if such information is still sufficiently accurate and applicable (i.e. the information may be applicable if each monitor system 102 is currently located at the same position where it had been located before when it collected any data that may have been used in prior modeling calculations).

In act 510, a probability is calculated for each position of the grid. Each calculated probability may represent the likelihood that any given position of the grid represents the geospatial location of the source 104 that is transmitting jamming or interfering signals 103. For example, the modeled RF propagation loss between each grid position and pairs of monitor systems 102 may be compared to the differences in the power ratio measured for the pair of monitor systems 102. The combined probability for each grid position may then be calculated as the product of the individual probabilities calculated for each set of monitor system 102 pairs. In a particular embodiment, each individual probability may be calculated by applying the normal probability distribution error function complement (ERFC) to the comparison of modeled propagation loss calculated in act 508 to actual power ratios calculated in act 506.

Act 512 includes determining whether the probabilities calculated in act 510 for a pair of angularly separated monitor systems 102 fails to correlate well with the combined likelihood of angularly closely spaced monitor systems 102. If a poor correlation exists, then system 100 may proceed with act 514 based on the assumption that a lack of correlation is due at least in part to use of a directional antenna by source 104.

Act 514 may include determining a hypothetical antenna gain power bias (db) that may at least partially explain the correlation failure determined in act 512. This example assumes the pair of closely spaced monitor systems 102 has a similar offsetting antenna pattern gains. Act 514 may include recalculating the pair-wise probabilities for the pair of separated monitor systems 102 with all other monitor systems 102 using the determined antenna-gain power bias. The combined probability may then be recalculated accordingly.

In various embodiments, act 514 may also or alternatively include matching probability outcomes to various known jammer antenna patterns. For example, act 514 may include accessing intelligence databases that include basic characteristics of known jammers antenna patterns. System 100 may perform pattern matching of the known antenna patterns with the power biases (power differences not attributable to RF propagation) for each monitor system 102 to compute the azimuth/elevation (az/el) boresight of the jammer antenna of source 104. The jammer to signal (J/S) ratio may then be estimated for the area surrounding each monitor system 102 using the measured power levels, the most likely jammer source 104 location, and/or predicted directional antenna pointing vector. This J/S ratio may be used to optimize the correlation between angularly separated and closely spaced monitor systems and ultimately to more accurately estimate the location of source 104.

Figure 6:
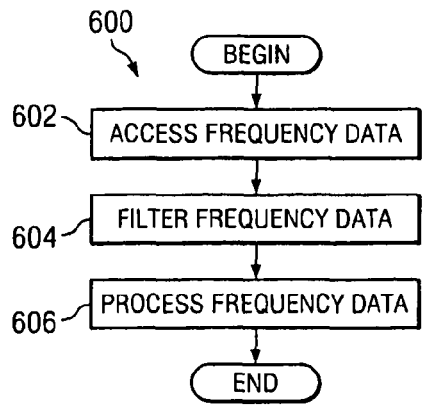
FIG. 6 shows a flowchart illustrating example actions that may be performed to process data related to the relative frequency differences of a jamming or interfering signal as determined by particular embodiments of the system of FIG. 1.

FIG. 6 shows a flowchart illustrating example actions that may be performed in act 600 of FIG. 2B to process data related to the frequencies of signal 103 as measured at one or more monitor systems 102. Various systems 100 may be capable of estimating a location of source 104 using at least a Doppler shift in frequency of signal 103. For example, the frequency of signal 103 measured by a mobile monitor system 102 may increase as the monitor system 102 moves toward the corresponding source 104. Conversely, the frequency of signal 103 measured by a mobile monitor system 102 may decrease as the monitor system 102 moves away from the source 104. In this example, the acts shown in FIG. 6 generally include using at least the measured Doppler shift of signal 103 to calculate the probability that each point or area in a particular geospatial grid includes the location of a source 104 transmitting jamming or interfering signals 103.

Act 602 includes accessing any frequency data that may have been collected in act 202 of FIG. 2A by one or more mobile monitor systems 102 (e.g., one or more monitor systems 102 disposed on and/or within manned or unmanned aircraft). For example, act 602 may include accessing one or more data files stored in computer-readable media. In a particular embodiment, the data files may contain frequency data measured at various points in time by a monitor system 102 disposed on or within a RQ-4 Global Hawk while in flight. Each frequency measurement may also be related to respective flight trajectory information of the RQ-4 Global Hawk determined at approximately the same time as the frequency measurement. Act 602 may include accessing this trajectory information as well, which in some embodiments may or may not be stored in the same data file as the frequency data.

In act 604, the frequency data may be filtered. In some embodiments, filtering the data may minimize the effects of independent measurement errors of some monitor systems 102 and/or the effects of signal noise. The data may be filtered in act 604 using any of a variety of mechanical, electrical, and/or algorithmic signal processing. For example, at least some of the noise in the frequency measurements received at each monitor system 102 may be filtered by determining the mean of a given number of data samples collected at the monitor system 102 (e.g., 60 samples, 250 samples, 300 samples, 500 samples etc.).

Act 606 includes processing the accessed data. For example, system 100 may compare the frequencies of signal 103 measured at different points in time and their respective trajectories. In a particular embodiment, the Doppler shift detected in these frequency measurements may be greatest if the monitor system 102 is traveling along a trajectory directly toward source 104 and the Doppler shift may be less than this greatest value if the monitor system 102 is traveling along a trajectory that does not intersect the location of source 104.

In various embodiments, the processing performed in act 606 may occur in real-time and may enable a feedback loop that is used for purposes of navigation. For example, a RQ-4 Global Hawk and/or munitions (e.g., missiles, bombs, etc.) that it may carry may include structure and function substantially similar to that described above with reference to monitor system 102 and/or reporting system 106. As the RQ-4 Global Hawk navigates toward a source 104 transmitting jamming or interfering signals 103, one or more internal processors may continually determine whether the current trajectory of the RQ-4 Global Hawk results in the greatest Doppler-shift increase in frequency of signal 103. An output may be generated that corrects the navigation path accordingly. In this manner, the RQ-4 Global Hawk and/or any munitions that it may deploy may be continually directed toward the source 104 transmitting jamming or interfering signals even if the source 104 is itself mobile. In some embodiments, accurate navigation toward source 104 may be possible even during circumstances where source 104 may be at least partially jamming signals 103 (e.g., GPS signals) that may otherwise be used to navigate. The accuracy of navigation based at least partially on Doppler shift processing may increase as the distance to source 104 decreases, thereby continually increasing the probability that source 104 may be discovered and disabled.

Although various embodiments of the present disclosure have been described in the context of formulating a geolocation solution for a source 104 transmitting jamming or interfering signals 103, system 100 may be capable of providing any of a variety of other outputs using the same or different data collected by monitor systems 102. For example, various embodiments may be capable of determining the estimated "field effect" of source 104 (e.g., the J/S power ratio), the impact on Dilution-of-Precision (DOP) (e.g., factors that may reduce GPS receiver accuracy), and characterization of source 104 including, for example, radiating frequency, antenna type, radiated power, and a classification as intentional jamming or unintentional jamming. In addition, system 100 may be capable of determining a monitor system 102 deployment plan based at least in part on the most likely deployment regions for jamming sources 104. As a function of the deployment plan, system 100 may be capable of outputting geolocation error maps bounding the jammer geolocation error for a specified region. In addition to any of the data types described above, some error maps may include as factors other types of data pertaining to the physical terrain, such as, for example, the topography, whether the terrain is urban or rural, the current weather of the terrain, any combination of the preceding, and/or some other factor.

It should also be noted that where a flowchart is used to demonstrate various aspects of particular embodiments, it should not be construed to be limited to any particular logic flow or logic implementation. The described logic may be partitioned into different logic blocks (e.g., programs, modules, functions, or subroutines) without changing the overall results. Often, logic elements may be added, modified, omitted, performed in a different order, or implemented using different logic constructs (e.g., logic gates, looping primitives, conditional logic, and other logic constructs).

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments, including future operating systems or environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). In a particular embodiment, all or a portion of Manager Application 310 may be embodied in any of a variety of other suitable computer-readable medium, such as, for example, removable media.

Although various embodiments have been described herein, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   receiving signal data generated at one or more monitor systems operable to monitor for electromagnetic signals, the signal data related to a plurality of characteristics of a first signal, the plurality of characteristics of the first signal comprising at least two of:
      a respective power of the first signal as measured at each of the one or more monitor systems;
      a respective frequency of the first signal as measured at each of the one or more monitor systems;
      a time the first signal arrived with respect to each of the one or more monitor systems; and
      an angle the first signal arrived with respect to each of the one or more monitor systems;
   accessing, by a computing system, situational data, wherein the situational data includes information of a physical condition at a location proximate to the one or more monitor systems, wherein the physical condition at the location proximate to the one or more monitor systems is selected from the group consisting of:
      the respective locations of at least two of the one or more monitor systems relative to each other;
      a physical terrain topography;
      a manmade topography;
      a value indicating the population density located within a predetermined range of the one or more monitor systems; and
      the weather at the one or more monitor systems;
   selectively discarding, automatically by the computing system, received signal data according to a signal characteristic, the discarding based at least partially on the information of the physical condition;
   calculating by the computing system a location of a source of the first signal at least in part by processing retained signal data according to a signal characteristic to generate a preliminary location for the signal characteristic and blending preliminary locations generated for the plurality of characteristics of the first signal; and
   determining that the first signal is jamming a second signal, the determination based at least in part on the calculated location.

2. The method of claim 1, wherein the received data comprises time-of-arrival data related to the time the signal arrived with respect to at least two of the one or more monitor systems, wherein the time-of-arrival data includes a time stamp of a feature of the first signal associated with an interfering signal, wherein the location of the source of the signal is determined at least in part using a difference between time stamps generated by the at least two monitor systems, and wherein an error between time stamps of the at least two monitoring systems is less than 5 nanoseconds.

3. The method of claim 1, wherein calculating by the computing system the location of the source of the signal comprises calculating a probability that the source is located at a position for each of a first plurality of positions.

4. The method of claim 3, wherein each position of the first plurality of positions corresponds to a respective geospatial area having a first size; and
   further comprising automatically optimizing the calculated location of the source at least in part by calculating a probability that the source is located at a position for each position of a second plurality of positions each corresponding to a respective geospatial area having a second size less than the first size, the respective geospatial areas corresponding to the first plurality of positions collectively comprising the respective geospatial areas corresponding to the second plurality of positions.

5. The method of claim 1, wherein at least one of the one or more monitor systems is capable of navigating toward the source of the signal using at least the calculated location of the source.

6. The method of claim 5, wherein the at least one of the one or more monitor systems is capable of disabling the source of the signal.

7. The method of claim 1, further comprising communicating an output displayable on a display as a digital map comprising a marker indicating the calculated location of the source of the signal.

8. The method of claim 1, wherein blending preliminary locations generated for the plurality of characteristics of the first signal includes weighting a first type of signal characteristic differently from a second type of signal characteristic to calculate the location of the source of the first signal.

9. A jammer locater system comprising:
a reporting system in communication with a network of monitor systems, the reporting system comprising a processor and a receiver, the reporting system configured to:
receive signal data generated by the network of monitor systems, the signal data related to a plurality of characteristics of a signal, the plurality of characteristics of the signal comprising at least two of:
a respective power of the first signal as measured at each of the one or more monitor systems;
a respective frequency of the first signal as measured at each of the one or more monitor systems;
a time the first signal arrived with respect to each of the one or more monitor systems; and
an angle the first signal arrived with respect to each of the one or more monitor systems;
access situational data, wherein the situational data includes information of a physical condition at a location proximate to the one or more monitor systems, wherein the physical condition at the location proximate to the network of monitor systems is selected from the group consisting of:
a geometric distribution of the network of monitor systems;
a physical terrain topography;
a manmade topography;
a value indicating the population density located within a predetermined range of the one or more monitor systems; and
the weather at the one or more monitor systems;
automatically selectively discard received signal data according to a signal characteristic, the discarding based at least partially on the information of the physical condition at a location proximate to the one or more monitor systems;
calculate a location of a source of the signal at least in part by processing retained signal data according to a signal characteristic to generate a preliminary location for the signal characteristic and blending preliminary locations generated for the plurality of characteristics of the signal; and
determine that the first signal is jamming a second signal, the determination based at least in part on the calculated location.

10. The jammer locater system of claim 9, wherein the received data comprises time-of-arrival data related to the time the signal arrived with respect to at least two of the network of monitor systems, wherein the time-of-arrival data includes a time stamp of a feature of the first signal associated with an interfering signal, wherein the location of the source of the signal is determined at least in part using a difference between time stamps generated by the at least two monitor systems, and wherein an error between time stamps generated by the at least two monitoring systems is less than 5 nanoseconds.

11. The jammer locater system of claim 9, wherein the reporting system is configured to calculate a probability that the source is located at a position for each of a first plurality of positions.

12. The jammer locater system of claim 11, wherein:
each position of the first plurality of positions corresponds to a respective geospatial area having a first size; and
the reporting system is configured to automatically optimize the calculated location of the source at least in part by calculating a probability that the source is located at a position for each position of a second plurality of positions each corresponding to a respective geospatial area having a second size less than the first size, the respective geospatial areas corresponding to the first plurality of positions collectively comprising the respective geospatial areas corresponding to the second plurality of positions.

13. The jammer locater system of claim 9, wherein at least one monitor system of the network of monitor systems is configured to navigate toward the source of the signal using at least the geolocation of the source calculated by the reporting system.

14. A non-transitory computer readable medium including instructions that, when performed by one or more processors, cause the one or more processors to:
receive signal data generated at one or more monitor systems operable to monitor for electromagnetic signals, the signal data related to a plurality of characteristics of a first signal, the plurality of characteristics of the first signal comprising at least two of:
a respective power of the first signal as measured at each of the one or more monitor systems;
a respective frequency of the first signal as measured at each of the one or more monitor systems;
a time the first signal arrived with respect to each of the one or more monitor systems; and
an angle the first signal arrived with respect to each of the one or more monitor systems;
access situational data, wherein the situational data includes information of a physical condition at a location proximate to the one or more monitor systems, wherein the physical condition at the location proximate to the one or more monitor systems is selected from the group consisting of:
the respective locations of at least two of the one or more monitor systems relative to each other;
a physical terrain topography;
a manmade topography;
a value indicating the population density located within a predetermined range of the one or more monitor systems; and
the weather at the one or more monitor systems;
automatically selectively discard received signal data according to a signal characteristic, the discarding based at least partially on the information of the physical condition at a location proximate to the one or more monitor systems;
calculate a location of a source of the signal at least in part by processing retained data according to a signal characteristic to generate a preliminary location for the signal characteristic and blending preliminary locations generated for the plurality of characteristics of the first signal; and
determine that the first signal is jamming a second signal, the determination based at least in part on the calculated location.

15. The computer-readable medium of claim 14, wherein the received data comprises time-of-arrival data related to the time the signal arrived with respect to at least two of the one or more monitor systems, wherein the time-of-arrival data includes a time stamp of a feature of the first signal associated with an interfering signal, wherein the location of the source of the signal is determined at least in part using a difference between time stamps generated by the at least two monitor systems, and wherein an error between time stamps generated by the at least two monitoring systems is less than 5 nanoseconds.

* * * * *